United States Patent [19]
Abusleme et al.

[11] Patent Number: 5,852,149
[45] Date of Patent: Dec. 22, 1998

[54] FLUOROELASTOMERS SUBSTANTIALLY FREE FROM POLAR TERMINALS AND RELATED PREPARATION PROCESS

[75] Inventors: Julio A. Abusleme, Saronno; Margherita Albano, Milan, both of Italy

[73] Assignee: Ausimont S.p.A., Italy

[21] Appl. No.: 904,886

[22] Filed: Aug. 4, 1997

Related U.S. Application Data

[63] Continuation of Ser. No. 638,378, Apr. 26, 1996, abandoned.

[30] Foreign Application Priority Data

Apr. 28, 1995 [IT] Italy ................. MI95A0854

[51] Int. Cl.$^6$ ................................................. C08F 16/24
[52] U.S. Cl. .................................... 526/247; 526/206
[58] Field of Search ............................ 526/247, 206

[56] References Cited

U.S. PATENT DOCUMENTS

| | | |
|---|---|---|
| 2,912,373 | 11/1959 | Carlson . |
| 3,707,529 | 12/1972 | Gladding et al. . |
| 3,752,787 | 8/1973 | de Brunner . |
| 3,876,654 | 4/1975 | Pattison . |
| 4,035,565 | 7/1977 | Apotheker et al. . |
| 4,233,427 | 11/1980 | Bargain et al. . |
| 4,243,770 | 1/1981 | Tatemoto et al. . |
| 4,256,856 | 3/1981 | Ito et al. ................................. 526/254 |
| 4,259,463 | 3/1981 | Moggi et al. . |
| 4,524,197 | 6/1985 | Khan . |
| 4,564,622 | 1/1986 | Streissle et al. . |
| 4,564,662 | 1/1986 | Albin ................................... 526/247 |
| 4,694,045 | 9/1987 | Moore . |
| 4,745,165 | 5/1988 | Arcella et al. . |
| 4,864,006 | 9/1989 | Giannetti et al. . |
| 4,943,622 | 7/1990 | Naraki et al. . |
| 5,173,553 | 12/1992 | Albano et al. . |

FOREIGN PATENT DOCUMENTS

| | | |
|---|---|---|
| 0 120 462 | 10/1984 | European Pat. Off. . |
| 0 136 596 | 4/1985 | European Pat. Off. . |
| 0 169 328 | 1/1986 | European Pat. Off. . |
| 0 182 299 | 5/1986 | European Pat. Off. . |
| 0 199 138 | 10/1986 | European Pat. Off. . |
| 0 335 705 | 10/1989 | European Pat. Off. . |
| 0 388 172 | 9/1990 | European Pat. Off. . |
| 0 410 351 | 1/1991 | European Pat. Off. . |
| 0 625 526 | 11/1994 | European Pat. Off. . |
| 0 626 396 | 11/1994 | European Pat. Off. . |
| 0 650 982 | 5/1995 | European Pat. Off. . |
| 0 661 304 | 7/1995 | European Pat. Off. . |
| 2822116 | 11/1978 | Germany ........................... 526/247 |
| 94/21697 | 9/1994 | WIPO . |

OTHER PUBLICATIONS

Official Gazette 1046 TMOG–2—Sep. 4, 1984.
Hawby's Condensed Chemical Dictionary. Sax et al Feb. 12, 1991. p. 160.

*Primary Examiner*—Bernard Lipman
*Assistant Examiner*—N. Sarofim
*Attorney, Agent, or Firm*—Finnegan, Henderson, Farabow, Garrett & Dunner, L.L.P.

[57] ABSTRACT

Fluoroelastomers substantially free from polar end groups, comprising vinylidene fluoride (VDF) and/or tetrafluoroethylene (TFE) and at least another fluorinated ethylenically unsaturated monomer. They are characterized by an high thermal stability, an optimal processability and curing easiness, without giving rise to pre-crosslinking phenomena and moreover they do not require prolonged post-curing treatments. Such fluroelastomers are advantageously prepared by copolymerization of the corresponding monomers in aqueous emulsion in the presence of ultraviolet-visible radiation (UV-VIS) and of an organic peroxide.

18 Claims, No Drawings

5,852,149

FLUOROELASTOMERS SUBSTANTIALLY FREE FROM POLAR TERMINALS AND RELATED PREPARATION PROCESS

This is a continuation of application Ser. No. 08/638,378, filed Apr. 26, 1996 now abandoned.

The present invention relates to fluoroelastomers susbstantially free from polar terminals, and to the related preparation process.

Various kinds of fluoroelastomers are known in the art, broadly used in all those fields wherein optimal elastic properties combined with high chemical and thermal stability are required. For a broad treatment of such products see for instance "Ullmann's Encyclopedia of Industrial Chemistry", vol. A-11, pag. 417–429 (1988, VCH Verlagsgesellschaft). They are copolymers based on vinylidene fluoride (VDF) and/or on tetrafluoroethylene (TFE), wherein such monomers are copolymerized with other fluorinated ethylenically unsaturated monomers, such as hexafluoropropene (HFP), perfluoroalkylvinylethers (PAVE), chlorotrifluoroethylene (CTFE) and the like, or also with unsaturated monomers having ethylenic unsaturation, such as ethylene and propylene.

The fluoroelastomers are usually prepared by polymerization in aqueous emulsion with radicalic initiators. The emulsion technique is preferred since it allows a quick and complete conversion of monomers, an efficient dispersion of the reaction heat and an easy separation of the polymer by latex coagulation. Inorganic peroxides, such as ammonium or potassium persulphate are used as initiators, with reaction temperatures of about 70°–90° C., or redox systems, for instance ammonium persulphate/sodium methabisulphite, at generally lower temperatures (20°–30° C.).

Such initiators unavoidably lead to the formation of polar terminal groups on the polymeric chain, both of ionic type, such as carboxylate —$COO^-$ and sulphonate —$OSO_3^-$ groups, and of non-ionic type, such as alcholic groups —$CH_2OH$, acylfluoride —COF, amidic —$CONH_2$, and the like.

As known, the presence of polar groups in the polymeric chain produces numerous drawbacks, essentially connected to the reactivity of such groups. They indeed, besides determining a decrease of the thermal stability of the polymer as such, interact with the curing system, giving rise to pre-crosslinking phenomena, with processability worsening. Moreover, the crosslinked product must be submitted to long post-curing processes in order to eliminate volatile by-products and stabilize the elastic and mechanical properties (usually by thermal treatment at 250° C. for 24 hours).

Various methods have been suggested to try to reduce the presence of polar terminals in fluoroelastomers. For instance, in U.S. Pat. No. 3,707,529 fluoroelastomers based on VDF having from 55 to 95% of non-ionic terminal groups and from 5 to 45% of ionic terminal groups, are described. The reduction in the content of ionic terminals is obtained by using an inorganic peroxidic initiator, for instance ammonium persulphate, and a chain transfer agent capable of giving non-ionic terminals, for instance an hydrocarbon, and by suitably dosing the initiator and transfer agent amounts in the reaction medium. The method shows clear operating difficulties, mainly connected to the identification of an optimal ratio between initiator and transfer agent, which can even considerably range from case to case depending on the specific products used and on the reaction conditions. But, what is more, the obtained fluoroelastomer will always contain a significant amount of ionic terminals deriving from the inorganic initiator.

In the international patent application WO 94/21697 a process for preparing fluorinated polymers is described, which consists in polymerizing the corresponding monomers in emulsion or aqueous suspension in the presence of an organic sulphinate of formula $R_fSO_2M_{1/x}$ or $R'_f[SO_2M_{1/x}]_n$, wherein $R_f$ and $R'_f$ are perfluoroalkylic radicals, M is hydrogen or a x-valent metal ion, n is an integer from 1 to 4, and of an inorganic peroxide, for instance ammonium persulphate. The peroxide has the purpose of oxidizing the sulphinate with formation of a sulphonyl radical, which by removal of $SO_2$ forms a fluoroaliphatic radical acting as initiator of the polymerization reaction. The use of this particular initiation system leads to the obtainment of fluorinated polymers prevailingly having non-polar terminals of perfluoroalkylic type. However, the presence of an inorganic peroxide in the reaction system unavoidably leads, analogously to what occurs in conventional processes, to the formation of radicals which give rise to polar terminals. Therefore, also in this case the percentage of polar terminals cannot be reduced to zero or to values near zero.

The Applicant has now surprisingly found that fluoroelastomers substantially free from polar terminal groups, both of ionic and non-ionic type, can be obtained by using as initiator an organic peroxide. Such fluoroelastomers show a high thermal stability, an optimal processability and curing easiness, without giving rise to pre-crosslinking phenomena. They moreover do not require prolonged post-curing treatments, showing elastic and mechanical properties substantially constant already after thermal treatment at 250° C. for a time of 4 hours or lower.

Object of the present invention are therefore fluoroelastomers comprising vinylidene fluoride (VDF) and/or tetrafluoroethylene (TFE) and at least another ethylenically unsaturated fluorinated monomer, said fluoroelastomers being substantially free from polar terminal groups.

By terminal groups are meant all the groups present at the ends of the main polymeric chain or of the long or short branchings optionally present.

By polar groups are meant both ionic groups, such as carboxylate —$COO^-$ and sulphonate —$OSO_3^-$ groups, and non-ionic groups, such as alchoolic —$CH_2OH$, acylfluoride —COF, amidic, —$CONH_2$, and the like.

By substantially free from polar groups it is meant that the amount of polar groups is zero or is in any case lower than 3% by moles, preferably lower than 1% by moles, with respect to the total amount of terminal groups.

The fluoroelastomers object of the present invention are prepared by using as radicalic initiator an organic peroxide, which can be selected, in particular, from:

(a) dialkylperoxides, wherein the alkyl group has from 1 to 12 carbon atoms, for instance diterbutylperoxide (DTBP);

(b) dialkylperoxydicarbonates, wherein the alkyl group has from 1 to 12 carbon atoms, for instance diisopropylperoxydicarbonate;

(c) diacylperoxides, wherein the acyl group has from 2 to 12 carbon atoms, for instance diacetylperoxide;

(d) peroxyesters having from 3 to 20 carbon atoms, for instance terbutylperoxyisobutyrate.

The use of organic peroxides of this type allows to obtain on the polymer terminal groups of alkylic type, which are chemically and thermally stable and do not give undesired interactions with the curing system. Differently from the processes known in the art, the total absence of inorganic initiators, such as persulphates, practically allows to completely avoid the formation of polar terminal groups, as confirmed by the NMR and IR analysis of the products.

In a preferred embodiment, the fluoroelastomers object of the present invention are prepared by copolymerization of the corresponding monomers in aqueous emulsion in the presence of ultraviolet-visible radiation (UV-VIS) and of an organic peroxide as defined above, as described in Italian patent application No. MI 93A/002317, filed on Feb. 11, 1993 in the name of the Applicant, corresponding to the European patent application No. 94116994.8, whose content is incorporated herein by reference.

Such process allows to operate within very broad temperature ranges, generally from −20° C. to +100° C., preferably from −10° to +40° C. It is to be noticed that it is possible to operate at temperatures lower than 0° C. by modifying in a suitable manner the characteristics of the aqueous phase, for instance by increasing the ionic strength and/or by adding a co-solvent. The reaction pressure can range from 3 to 50 bar, preferably from 10 to 20 bar.

As regards the UW-VIS radiation, this is provided to the reaction system by means of a suitable emission source, according to conventional techniques, commonly used for photochemical reactions, for instance by means of a high pressure mercury lamp. The UV-VIS radiation wavelength suitable for the process object of the present invention is generally comprised between 220 and 600 nm. It is to be pointed out that the use of radiation for generating radicals generally allows a better control of the reaction kinetics, and in particular, in the case of polymerization runaway, it is possible to deactivate immediately the radiation source and therefore to stop the reaction.

As known, the emulsion technique requires also the presence of surfactants. Surfactants, at least partially fluorinated, are particularly preferred, which correspond to the general formula:

where $R_f$ is a (per)fluoroalkyl chain $C_5$–$C_{16}$ or a (per)fluoropolyoxyalkylene chain, $X^-$ is —COO$^-$ or —SO$_3^-$, $M^+$ is selected from: $H^+$, $NH_4^+$, alkali metal ion. Among those more commonly used we mention: ammonium perfluorooctanoate, (per)fluoropolyoxyalkylenes end-capped with one or more carboxyl groups, partially fluorinated alkylsulphonates as described in U.S. Pat. No. 4,524,197, and the like.

Chain transfer agents can be added to the reaction mixture, which are selected among those commonly used in the fluoroelastomers synthesis. Transfer chains which do not give polar terminals are particularly preferred, such as, hydrogen; hydrocarbons having from 1 to 12 carbon atoms, for instance methane, ethane, methylcyclopentane; chloro(fluoro)carbons having from 1 to 10 carbon atoms, optionally containing hydrogen, for instance chloroform, trichlorofluoromethane; esters, alcohols, ethers having from 1 to 12 carbon atoms, for instance ethylacetate, diethylmalonate, diethylether, isopropanol, and the like.

The preparation of the fluoroelastomers object of the present invention can be advantageously carried out in aqueous emulsion in the presence of microemulsions of perfluoropolyoxyalkylenes, as described in U.S. Pat. No. 4,864,006, or also of microemulsions of fluoropolyoxyalkylenes having hydrogenated terminals and/or hydrogenated repeating units, according to EP patent 625,526.

The fluoroelastomers object of the present invention comprise VDF and/or TFE copolymers containing at least another fluorinated monomer ethylenically unsaturated, selected for instance from: perfluoroolefins $C_3$–$C_8$, such as hexafluoropropene (HFP), perfluorobutene; fluoroolefins $C_2$–$C_8$ containing hydrogen and/or chlorine and/or bromine and/or iodine, such as trifluoroethylene, pentafluoropropene, chlorotrifluoroethylene (CTFE), bromotrifluoroethylene; (per)fluoroalkylvinylethers (PAVE) $CF_2$=$CFOR_f$, wherein $R_f$ is a (per)fluoroalkyl $C_1$–$C_6$ for instance trifluoromethyl, bromodifluoromethyl, pentafluoropropyl; perfluorooxyalkylvinylethers $CF_2$=$CFOX$, wherein X is a perfluorooxyalkyl $C_1$–$C_{12}$ having one or more ether groups, for instance perfluoro-2-propoxy-propyl. Also small amounts of units deriving from a fluorinated bis-olefin can be present in the polymer, as described in EP patent application 94120504.9 in the name of the Applicant.

The fluoroelastomers object of the present invention can also contain units deriving from non fluorinated ethylenically unsaturated monomers, in particular non fluorinated olefins (Ol) $C_2$–$C_8$, such as ethylene and propylene.

Typical compositions of fluoroelastomers based on VDF are the following: (a) VDF 45–85%, HFP 15–45%, TFE 0–30%; (b) VDF 50–80%, PAVE 5–50%, TFE 0–20%; (c) VDF 20–30%, Ol 10–30%, HFP and/or PAVE 18–27%, TFE 10–30%.

Typical compositions of fluoroelastomers based on TFE are the following: (d) TFE 50–80%, PAVE 20–50%; (e) TFE 45–65%, Ol 20–55%, 0–30% VDF; (f) TFE 32–60%, Ol 10–40%, PAVE 20–40%; (g) TFE 33–75%, PAVE 15–45%, VDF 10–22%.

The fluoroelastomers object of the present invention can be cured both by ionic and peroxidic way.

In case of ionic curing, suitable curing agents and accelerants, well known in the art, are added to the curing blend. For instance, polyhydroxylated, aromatic or aliphatic compounds, or their derivatives, as described for instance in EP 335,705 and U.S. Pat. No. 4,233,427, can be used as curing agents. Among them can be mentioned in particular: di-, tri- and tetra-hydroxy benzenes, naphthalenes or anthracenes; bisphenols wherein the two aromatic rings are connected between each other by an aliphatic, cycloaliphatic or aromatic bivalent radical, or by an oxygen atom or sulphur, or also a carbonyl group. The aromatic rings can be replaced by one or more chlorine, fluorine, bromine atoms, or by carbonyls, alkyls, acyls. As accelerants can be used for instance: quaternary ammonium or phosphonium salts (see for instance EP 335,705 and U.S. Pat. No. 3,876,654); amino-phosphonium salts (see for instance U.S. Pat. No. 4,259,463); phosphoranes (see for instance U.S. Pat. No. 3,752,787); imine compounds described in EP 182,299 and EP 120,462); etc. The curing blend comprises moreover basic compounds, in amounts of from 1 to 150 by weight with respect to the polymer, for instance divalent metals oxides or hydroxides, such as Mg, Zn, Ca or Pb, optionally associated to a salt of a weak acid (for instance stearates, benzoates, carbonates, oxalates or phosphites of Ba, Na, K, Pb, Ca) Other conventional additives, such as thickening agents, pigments, antioxidants, stabilizers, and the like, can be then added to the curing blend.

In case of peroxidic curing, fluoroelastomers must contain in chain and/or in terminal position iodine and/or bromine atoms. The introduction of such atoms can be carried out by adding, in the reaction mixture, brominated and/or iodinated "cure-site" comonomers, such as bromine and/or iodine olefins having from 2 to 10 carbon atoms (as described for instance in U.S. Pat. Nos. 4,035,565 and 4,694,045), or iodine an/or bromine fluoroalkylvinylethers (as described in U.S. Pat. Nos. 4,745,165, 4,564,662 and EP 199,138), in such amounts that the content of "cure-site" comonomers in the final product is generally comprised between 0.05 and 2 moles per 100 moles of the other basic monomeric units. Alternatively or also in association with "cure-site" comonomers, it is possible to introduce terminal iodine and/or bromine atoms by addition to the reaction mixture of iodinated and/or brominated chain transfer agents, such as for instance the compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2 (see for instance patents U.S. Pat. Nos. 4,243,770 and 4,943,622). It is also possible to use as chain transfer agents iodides and/or bromides of alkaline or earth-alkaline metals, according to U.S. Pat. No. 5,173,553.

Curing by peroxidic way is carried out according to known techniques, by addition of a suitable peroxide capable of generating radicals by heating. Among those more commonly used we remember: dialkylperoxides, such as for instance diterbutyl-peroxide and 2,5-dimethyl-2,5-di (terbutylperoxy)hexane; dicumyl peroxide; dibenzoyl peroxide; diterbutyl perbenzoate; di[1,3-dimethyl-3-(terbutylperoxy)butyl]carbonate. Other peroxidic systems are described, for instance, in European patent applications EP 136,596 and EP 410,351. The curing blend comprises moreover inorganic basic compounds as described above for the ionic curing, and curing coagents, in amounts generally from 0.5 to 100 by weight with respect to the polymer, such as: triallyl-cyanurate; triallyl-isocyanurate (TAIC); tris (diallylamina)-s-triazine; triallylphosphite; N,N-diallyl-acrylamide; N,N,N',N'-tetraallyl-malonamide; trivinyl-isocyanurate; 2,4,6-trivinylmethyltrisiloxane, etc.; TAIC is particularly preferred.

It is also possible to use systems of mixed curing, both ionic and peroxidic, as described in EP 136,596.

The present invention will be now better illustrated by the following working examples, which purpose is merely indicative but not limitative of the scope of the invention.

EXAMPLE 1

On the lateral wall of a 2 l AISI 316 stainless steel autoclave, equipped with a stirrer working at 400 rpm, a quartz window was inserted, in correspondence of which a UV lamp of Hanau® TQ-150 type was installed. It is a high pressure mercury lamp emitting radiation comprised from 240 to 600 nm, with a power of 13.2 W for radiation from 240 to 330 nm.

The autoclave was evacuated and there were introduced in sequence:

1400 g of demineralized $H_2O$, devoid of $O_2$;

18.3 g of a microemulsion consisting of: 18.37% by weight of Galden® D02, having the formula:

$$CF_3O-(CF_2-CF(CF_3)O)_m(CF_2O)_n-CF_3$$

having m/n=20 and an average molecular weight of 450; 30.61% by weight of a surfactant having the formula: $CF_3O-(CF_2-CF(CF_3)O)_m(CF_2O)_n-CF_2COO^- NH_4^+$ having m/n=26.2 and an average molecular weight of 580; the remainder being $H_2O$;

The autoclave was then brought to 85° C. and to a pressure of 15 absolute bar by a monomeric mixture consisting of 55% by moles of VDF and 45% by moles of HFP. The UV lamp was then switched on and contemporaneously diterbutylproxide (DTBP) started to be fed with a capacity of 2.0 g/hour for an overall time of 90 min. The initial pressure was kept constant for the whole reaction by continuously feeding a mixture of VDF and HFP in molar ratio 80/20. After 360 minutes from the reaction start, the lamp was switched off and the autoclave vented and discharged at room temperature. A latex was thus obtained having concentration equal to 250 g of polymer/l $H_2O$. After coagulation by addition of an aqueous solution of aluminium sulphate under mechanical stirring, the polymer was dried at 60° C. for 2 hours and submitted to FT-IR, $^1$H-NMR (300 MHz) and $^{19}$F-NMR (188 MHz) analysis. The obtained spectra have stressed the presence of the following terminal groups: $-CH_3$, (33% by moles) and $-CF_2H$ (67% by moles) and the total absence of polar groups, such as $-CH_2OH$, carbonyls, carboxyls. The characteristics of the polymer as such are reported in Table 1. The monomeric composition was calculated on the basis of the $^{19}$F-NMR spectrum. It is moreover indicated the colour of the polymer after thermal tratment: a clear colour is index of the higher thermal stability of the polymer.

The so obtained fluoroelastomer was then ionically cured. In Table 2 are reported the composition of the curing blend, the ODR curing curve and the characteristics of the cured product. It is to be noted that the fluoroelastomers free from polar terminal groups according to the invention show, the curing degree being equal, (that is MH, maximum torque), lower ML values (minimum torque) with respect to the copolymers of the art. This indicates a lower initial viscosity and therefore a better blend workability.

In Table 2 are also reported the compression set values measured on O-ring immediately after the curing and at different times of post-curing. It can be noticed how the products according to the invention show substantially constant values already after only 4 hours of post-curing at 250° C.

EXAMPLE 2 (comparative)

In a 10 l autoclave, equipped with a stirrer working at 540 rpm, were placed, after evacuation, 6.5 l of demineralized water. The autoclave was then brought to 85° C. and maintained at such a temperature for the whole reaction. A monomeric mixture consisting of 55% by moles of VDF and 45% by moles of HFP, was fed therein until a pressure of 15 absolute bar was reached. 28.6 g of ammonium persulphate (APS) in the form of aqueous solution having concentration equal to 150 g/l were then introduced. The pressure was kept constant by continuously feeding a mixture consisting of 79% by moles of VDF and 21% by moles of HFP. During the reaction a total amount of 19.0 g of ethylacetate as chain transfer agent were fed, subdivided into the following parts: 9.5 g after 5% of conversion of the monomers, and then 2.375 g every increase of 19% in the conversion.

After 63 minutes of reaction, the autoclave was cooled and vented and a latex containing 430 g/l $H_2O$ of polymer was discharged. After coagulation by addition of an aqueous solution of aluminium sulphate under mechanical stirring, the polymer was dried at 60° C. for 24 hours and submitted to FT-IR, $^1$H-NMR and $^{19}$F-NMR analysis. The obtained spectra have stressed the presence of the following terminal groups: $-CF_2H$ (64% by moles), $CH_3$ (17% by moles), $-CH_2OH$ (19% by moles). The characteristics of the polymer as such are reported in Table 1.

The so obtained fluoroelastomer was then tonically cured. In Table 2 are reported the composition of the curing blend, the ODR curing curve and the characteristics of the cured product and the compression set values for rising times of post-curing.

EXAMPLE 3

Example 1 was repeated under the same conditions, except that the DTBP feeding was stopped after 45 min from the beginning of the test. After 360 min, the polymerization was stopped, thus obtaining a latex having concentration equal to 225 g/l $H_2O$. After coagulation, separation, washing and drying, the obtained polymer was submitted to FT-IR, $^1$H-NMR and $^{19}$F-NMR analysis. Analogously to example 1 the obtained spectra have stressed the presence of the following terminal groups: —CF$_2$H and CH$_3$ (and the total absence of polar groups). Table 1 reports the characteristics of the polymer as such, while the characteristics of the product submitted to ionic curing are indicated in Table 2.

EXAMPLE 4 (comparative)

Example 2 was repeated under the same conditions, except that the added total amount of APS was 13.0 g, while the added total amount of ethylacetate was equal to 8.5 g, subdivided into parts as follows:

0.9 g after 5% of conversion of the monomers, and then 1.9 g every increase of 19% in the conversion. After 73 minutes of reaction, a latex containing 430 g/l H$_2$O of polymer was obtained. After coagulation, separation, washing and drying, the obtained polymer was submitted to FT-IR, $^1$H-NMR and $^{19}$F-NMR analysis. Analogously to example 2 the obtained spectra have stressed the presence of the following terminal groups: —CF$_2$H, CH$_3$ and —CH$_2$OH. Table 1 reports the characteristics of the polymer as such, while the characteristics of the product submitted to ionic curing are indicated in Table 2.

TABLE 1

| EXAMPLE | 1 | 2(*) | 3 | 4(*) |
|---|---|---|---|---|
| Polymer composition (% by mole) | | | | |
| VDF | 80.4 | 79.3 | 80.1 | 79.5 |
| HFP | 19.6 | 20.7 | 19.9 | 20.5 |
| Mooney viscosity (ASTM D1646-82) ML(1 + 10') 121° C. | 7 | 8 | 40 | 40 |
| M$_n$ (ASTM D3593-80) | 46,000 | 39,500 | 81,000 | 79,100 |
| M$_w$/M$_n$ | 2.6 | 2.9 | 2.9 | 3.3 |
| T$_g$ mid-point (°C.) (DSC - ASTM D3418-82) | −23 | −20 | −23 | −20 |
| Colour after thermal treatment at 230° C. for 1 hour | slight brown | dark brown | white | dark brown |

(*)comparative

TABLE 2

| EXAMPLE | 1 | 2(*) | 3 | 4(*) |
|---|---|---|---|---|
| Blend composition | | | | |
| Polymer (g) | 100 | 100 | 100 | 100 |
| Bisphenol AF (phr) | 2 | 1.4 | 2 | 1.4 |
| Accelerator (§) (phr) | 0.45 | 0.45 | 0.45 | 0.36 |
| MgO (phr) | 3 | 3 | 3 | 3 |
| Ca(OH)$_2$ (phr) | 6 | 6 | 6 | 6 |
| Carbon black MT (phr) | 30 | 30 | 30 | 30 |
| Curing curve ODR (177° C. arc = 3 - ASTM D2084-81) | | | | |
| ML (N · m) | 0.28 | 0.34 | 1.02 | 1.47 |
| MH (N · m) | 7.32 | 7.12 | 9.71 | 9.71 |
| t$_{s2}$ (sec) | 138 | 138 | 177 | 129 |
| t'$_{90}$ (sec) | 225 | 300 | 288 | 261 |
| V$_{max}$ (N · m/sec) | 0.14 | 0.15 | 0.15 | 0.15 |
| Compression set (at 200° C./70 hours on O-ring D214 - ASTM D395 Method B) | | | | |
| *after curing in press at 170° C./10 min | 57 | 63 | 47 | 46 |
| *after post-curing in stove at 250° C./4 hrs | 28 | 38 | 22 | 28 |
| *after post-curing in stove at 250° C./16 hrs | 30 | 28 | 21 | 24 |
| *after post-curing in stove at 250° C./24 hrs | 27 | 26 | 20 | 20 |
| Mechanical properties at 23° C. after post-curing in stove at 250° C./24 hours (ASTM D412-83) | | | | |
| Modulus at 100% (MPa) | 4.8 | 4.3 | 6.1 | 4.5 |
| Breaking load (MPa) | 10.7 | 13.0 | 14.2 | 14.8 |
| Elongation at break (%) | 185 | 206 | 184 | 234 |
| Shore A hardness (points) | 72 | 68 | 73 | 70 |

(§) diphenil-benzyl-N,N-diethyl-aminophosphonium chloride
(*) comparative

We claim:

1. A fluoroelastomer comprising vinylidene fluoride (VDF) and/or tetrafluoroethylene (TFE) and at least another fluorinated monomer ethylenically unsaturated, said fluoroelastomer having polar terminal groups in an amount of less than 3% by moles with respect to the total amount of terminal groups.

2. The fluoroelastomer according to claim 1, comprising from 20 to 85% by moles of VDF and/or TFE and at least another fluorinated ethylenically unsaturated monomer, selected from the group consisting of perfluoroolefins C$_3$–C$_8$ fluoroolefins C$_2$–C$_8$ containing at least one of hydrogen, chlorine, bromine, and iodine; (per)fluoroalkylvinylethers (PAVE) CF$_2$=CFOR$_f$ wherein R$_f$ is either (per)fluoroalkyl C$_1$–C$_6$ or perfluorooxyalkylvinylethers CF$_2$=CFOX, wherein X is a perfluorooxyalkyl C$_1$–C$_{12}$ having one or more ether groups.

3. The fluoroelastomer according to claims 1 or 2, further comprising a non-fluorinated ethylenically unsaturated monomer.

4. The fluoroelastomer according to claim 3, wherein the non-fluorinated ethylenically unsaturated monomer is selected from ethylene and propylene.

5. Process for preparing fluoroelastomers according to claim 1, which comprises copolymerization of the corresponding monomers in aqueous emulsion in the presence of ultraviolet-visible radiation (UV-VIS) and of an organic peroxide.

6. Process according to claim 5, wherein the organic peroxide is selected from: dialkylperoxides wherein the alkyl group has from 1 to 12 carbon atoms; dialkylperoxydicarbonates wherein the alkyl group has from 1 to 12 carbon atoms; diacyl-peroxides wherein the acyl group has from 2 to 12 carbon atoms; peroxyesters having from 3 to 20 carbon atoms.

7. Process according to claim 6, wherein the organic peroxide is diterbutylperoxide.

8. Process according to claim 5, wherein the copolymerization is carried out in the presence of a chain transfer agent.

9. Process according to claim 8, wherein the chain transfer agent is selected from: hydrogen; hydrocarbons having from 1 to 12 carbon atoms; chloro(fluoro)carbons having from 1 to 8 carbon atoms, optionally containing hydrogen, esters, alcohols, and ethers having from 1 to 12 carbon atoms.

10. Process according to claim 8, wherein the chain transfer agent is selected from the compounds of formula R$_f$(I)$_x$(Br)$_y$ wherein R$_f$ is a (per)fluoroalkyl or a (per)fluorochloroalkyl having from 1 to 8 carbon atoms while x and y are integers from 0 to 2.

11. Fluoroelastomers obtained by the process of claim 5.
12. Fluoroelastomers obtained by the process of claim 6.
13. Fluoroelastomers obtained by the process of claim 7.
14. Fluoroelastomers obtained by the process of claim 8.

15. Fluoroelastomers obtained by the process of claim 9.

16. Fluoroelastomers obtained by the process of claim 10.

17. The fluoroelastomer of claim 1, wherein the polar terminal groups are present in an amount of less than 1% by moles.

18. The fluoroelastomer of claim 1, wherein the fluoroelastomer is completely free of polar terminal groups.

* * * * *